United States Patent
Bagwell et al.

(10) Patent No.: US 12,245,053 B1
(45) Date of Patent: Mar. 4, 2025

(54) SYSTEMS AND METHODS FOR ADDING NODES TO A WIRELESS NETWORK

(71) Applicant: Synapse Wireless, Inc., Huntsville, AL (US)

(72) Inventors: Coleman D. Bagwell, Madison, AL (US); Jon Martin, Huntsville, AL (US); Benjamin Kade Taylor, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 576 days.

(21) Appl. No.: 17/685,070

(22) Filed: Mar. 2, 2022

Related U.S. Application Data

(63) Continuation-in-part of application No. 17/537,117, filed on Nov. 29, 2021, now abandoned.

(51) Int. Cl.
| | | |
|---|---|---|
| H04W 24/02 | (2009.01) | |
| H04W 4/06 | (2009.01) | |
| H04W 40/20 | (2009.01) | |
| H04W 64/00 | (2009.01) | |
| H04L 12/18 | (2006.01) | |

(52) U.S. Cl.
CPC ............ *H04W 24/02* (2013.01); *H04W 4/06* (2013.01); *H04W 40/20* (2013.01); *H04W 64/003* (2013.01); *H04L 12/189* (2013.01)

(58) Field of Classification Search
CPC ..... H04W 40/246; H04W 4/08; H04W 84/18; H04W 24/02; H04W 4/06; H04W 40/20; H04W 64/003; H04L 12/189
See application file for complete search history.

(56) References Cited

U.S. PATENT DOCUMENTS

| | | | |
|---|---|---|---|
| 7,830,838 B2 | 11/2010 | Kohvakka et al. | |
| 8,064,363 B2 | 11/2011 | Kohvakka et al. | |
| 9,226,220 B2 | 12/2015 | Banks et al. | |
| 9,374,874 B1 | 6/2016 | Ewing | |
| 10,499,264 B1 | 12/2019 | Juven et al. | |
| 10,680,899 B1 | 6/2020 | Ibarra | |
| 10,778,330 B1 | 9/2020 | Zoller | |
| 11,036,377 B1 | 6/2021 | Ryan | |
| 11,163,031 B1 | 11/2021 | Zoller | |
| 11,284,476 B1 | 3/2022 | Zoller | |
| 11,706,864 B1* | 7/2023 | Mabry | H05B 47/19 315/130 |
| 2012/0082062 A1 | 4/2012 | McCormack | |
| 2022/0078607 A1* | 3/2022 | Link | H04W 76/10 |

OTHER PUBLICATIONS

Martin, U.S. Appl. No. 17/537,117 entitled, "Systems and Methods for Adding Nodes to a Wireless Network," filed Nov. 29, 2021.

* cited by examiner

*Primary Examiner* — Mandish K Randhawa
(74) *Attorney, Agent, or Firm* — Butler Snow LLP; Jon E. Holland

(57) ABSTRACT

Systems and methods are provided for selecting a suitable proxy to be used for adding a new node to an existing wireless mesh network and quickly finding the new node and bringing it into a wireless mesh network. More specifically, in some embodiments of the present disclosure, a neighbor of the target node can be automatically and quickly found and used as a proxy to update the network settings of the target node, enabling the target node to communicate on an existing network. In some embodiments, a proxy node can be selected based on relative locations of the new and existing nodes, as indicated by a site map.

15 Claims, 6 Drawing Sheets

SYSTEMS AND METHODS FOR ADDING NODES TO A WIRELESS NETWORK

CROSS REFERENCE TO RELATED APPLICATION

This application is a continuation-in-part of and claims priority to U.S. patent application Ser. No. 17/537,117, entitled "Systems and Methods for Adding Nodes to a Wireless Network" and filed on Nov. 29, 2021, which is incorporated herein by reference.

BACKGROUND

A wireless network having a plurality of interconnected nodes can be incorporated into a control system, such as a lighting control system, used in a facility. A given wireless network generally uses unique network settings to avoid "crosstalk" with other networks. Occasionally, it may be desirable to add a new node to the network to replace an existing node or expand the network. Notably, the new node (the "target" node) must be able to communicate with nodes on the existing network using the existing network configuration. In the case that the existing network's configuration does not match the target node's network configuration, a close node (the "proxy") that is already on the wireless network can be used to configure the target node. The proxy can change its network settings to the target node's network configuration for enabling communication with the target node, configure the network settings of the target node with the existent configuration of the wireless network, and command the target node to start using the network settings for the existing wireless network so that the target node may begin communicating with other nodes of the network. It is generally desirable for the target node to be added quickly with very little disruption to the network. It is also desirable for a proxy node to be in direct range of the target node for communication with the target node, but it can be difficult to identify a suitable proxy node particularly when the exact location of the target node is unknown.

One approach to the selection of the proxy is a manual effort that requires human intervention. In this regard, a human may select the proxy node by visually confirming its location relative to the location of the new node that has not yet joined the network. In a lighting system, locating the proxy is often performed using some type of visual indicator, such as submitting lighting control inputs to turn on or off a light fixture in close proximity to the new node. The need for having human interaction increases the cost and time required for installation of the new node.

An alternative approach to adding a new node to an existing wireless network involves instructing all nodes in the network to attempt communication with the target node regardless of the position of each network node. Here, each existing node may be configured to change to the target node's network configuration and configure the target node if it is in direct communication range (i.e., within one hop) of the target node. While this approach could eliminate some of the need for human interaction, it causes significant disruption to the network since each of the nodes at least temporarily communicates on the network settings of the target node rather than the settings of the network.

Thus, improved techniques for finding a suitable proxy to be used for adding a new node to an existing network and quickly bringing the new node into the network are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, wherever possible, the same reference numbers are used throughout the drawings to refer to the same or like parts.

DETAILED DESCRIPTION

Figure 1:
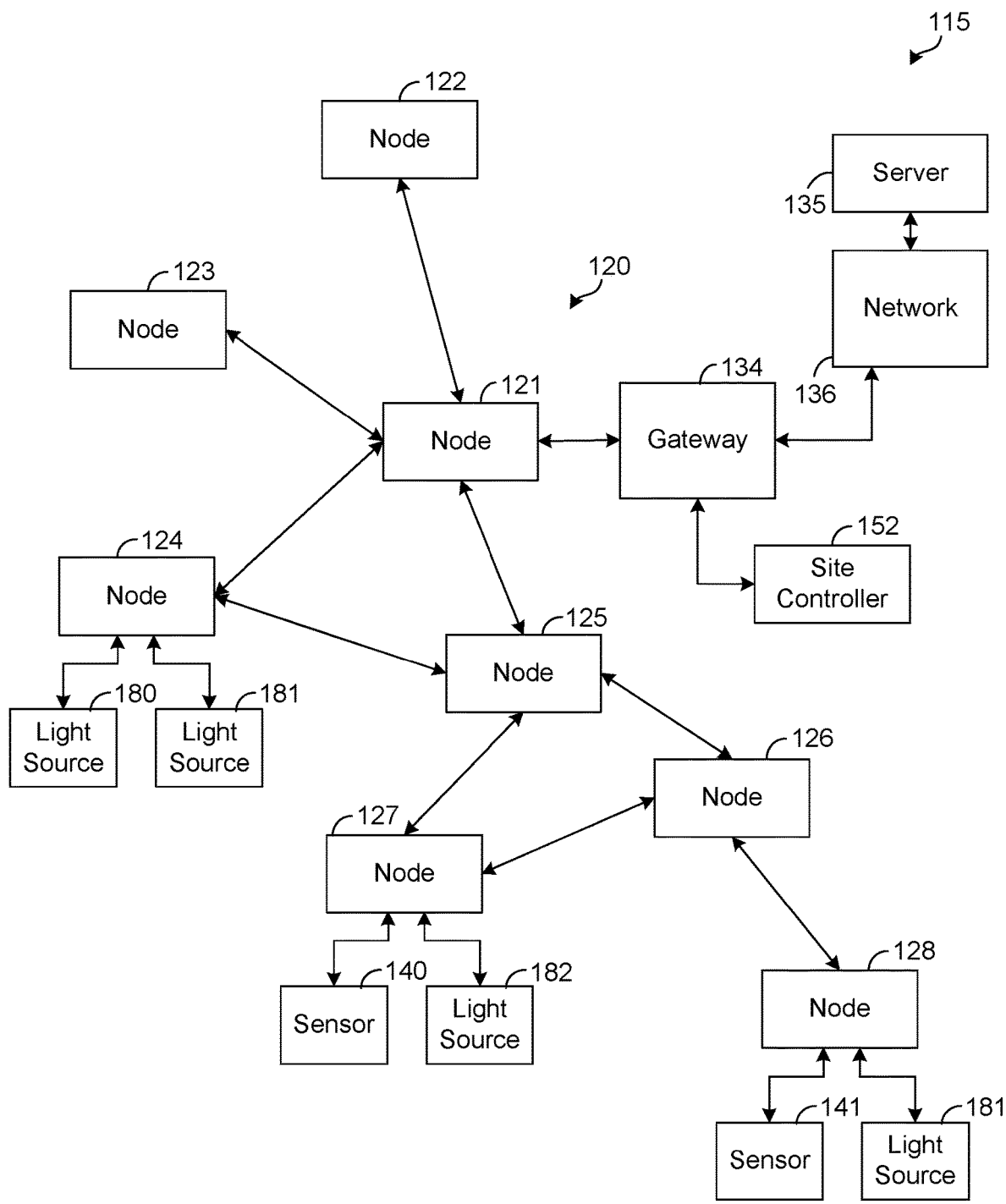
FIG. 1 is a block diagram illustrating an exemplary embodiment of a communication system having at least one wireless network.

The present disclosure generally pertains to systems and methods for adding nodes to a wireless network. In some embodiments of the present disclosure, a neighbor of a target node can be automatically and quickly found and used as a proxy to update the network settings of the target node. In other embodiments, a site map indicating the locations of network nodes can be used for finding a proxy to update the network settings of the target node. In any of these embodiments, a suitable proxy can be quickly and efficiently found with relatively little involvement from the installer or other user, thereby decreasing the costs and time of installation.

In one exemplary embodiment, a site controller can be configured to identify automatically a subset of nodes (hereafter, "cover nodes") that cover the entire network. The site controller may then broadcast at least one multicast message identifying the cover nodes and the order that the cover nodes are to attempt communication with the new node (hereafter, "target node"). In the indicated order, the cover nodes may switch to the network settings of the target node and then attempt to communicate with the target node. If a cover node is able to successfully communicate with the target node, such cover node may update the network settings of the target node to match the network settings of the existing network, thus enabling the target node to communicate on the existing network. This cover node may also broadcast a multicast message to notify the other cover nodes that the target node has been located so that the remaining cover nodes do not attempt to communicate with the target node. If the target node has not been successfully found after each cover node in the list has attempted to communicate with the target node, site controller may identify another set of cover nodes excluding the nodes that have already attempted communication with the target node. This process may be repeated until a cover node has successfully communicated with the target node. By using an algorithm that limits the number of cover nodes that attempt communication with the target node until the target node is found, disruption to the network is reduced.

In another exemplary embodiment, a site controller may use a site map in order to quickly find a proxy for configuring a new node. In this regard, a user (e.g., an installer of a new node) may provide an input indicating a location of the new node, such as placing an icon representing the new node on a site map. An icon may be placed for each node in the network so that a user can look at the site map to see the approximate physical location of each node. In response, a site controller may compare the location of the node to locations of the existing nodes of the network in order to identify a node that is close to the new node. As an example, the site controller may determine a distance between the new nodes and other nodes of the network (as indicated by the site map) and select as the proxy the node having the shortest distance to the new node. The site controller may then instruct the proxy to attempt communication with the new node for changing its network settings. If communication with the new node is unsuccessful, the site controller may use similar techniques to select a new proxy, such as by selecting the next closest node to the target node. This process may be repeated until communication with the new node is successful. Thus, the new node may be successfully found and brought into the network quickly with very little disruption to the network.

FIG. 1 depicts an exemplary embodiment of a communication system 115 having at least one wireless network 120. For illustrative purposes, the system 115 will be described in the context of a lighting control system that is used to control light sources at one or more locations at a facility, such as a manufacturing facility or other building where lights may be used and controlled. However, the system 115 may be any type of system that employs a wireless network for other purposes.

As shown by FIG. 1, the system 115 may have a server 135 connected to at least one gateway 134 through a network 136. The network 136 may comprise any conventional network, including any wide area network (WAN), such as the Internet, or local area network (LAN). The gateway 134 may serve as an interface between the wireless network 120 and the network 136. In this regard, the gateway 134 may receive from the wireless network 120 messages in accordance with a protocol of the network 120 and convert the messages into a format compatible with the network 126. As an example, the gateway 134 may encapsulate messages from the wireless network 120 with overhead for communication of the messages through the network 136. Further, the gateway 134 may receive from the network 126 messages in accordance with a protocol of the network 136 and convert the messages into a format compatible with the wireless network 120. As an example, the gateway 134 may deencapsulate such message to remove overhead in accordance with the protocol of the network 136 and then transmit the message to one or more nodes of the wireless network 120.

As shown by FIG. 1, the wireless network 120 may be defined by a plurality of nodes 121-128 that wirelessly communicate with each other. In the embodiment of FIG. 1, eight nodes 121-128 are depicted for simplicity, but the network 120 may have any number of nodes 121-128 in other embodiments. Each node 121-128 may be assigned to and located at a specific location within a facility (e.g., a particular room or area of a building). In some embodiments, the nodes 121-128 form a wireless mesh network 120, but other types of wireless networks may be formed by the nodes 121-128 in other embodiments. As further shown by FIG. 1, at least some of the nodes 121-128 may be coupled to one or more light sources 180-183 and/or sensors 140-141 and control the light sources 180-183, as will be described in more detail below.

In this regard, a site controller 152 may be configured to transmit to a node 121-128 connected to a light source 180-183 commands instructing such node to control the light source 180-183, as may be desired. Further, the site controller 152 may receive information from the nodes 121-128 regarding the operation of the light sources 180-183 or conditions sensed by the sensors 140-141 for use in controlling the light sources 180-183. As an example, the site controller 152 may instruct the one or more nodes 121-128 to control and change the states of one or more light sources 180-183 in response to inputs detected by one or more sensors 140-141. Lighting systems for using nodes of a wireless network for controlling light sources are described in commonly-assigned U.S. Pat. No. 9,374,874, entitled "Lighting Control Systems and Methods" and granted on Jun. 21, 2016, which is incorporated herein by reference.

While FIG. 1 is described in the context of a lighting system, the system 115 may be used in other applications by other embodiments. As an example, various applications for wireless networks are described in commonly-assigned U.S. Pat. No. 7,970,871, entitled "Systems and Methods for Dynamically Configuring Node Behavior in a Sensor Network," and granted on Jun. 28, 2011; and commonly-assigned U.S. Pat. No. 9,619,989, entitled "Asset Tracking Systems and Methods," and granted on Apr. 11, 2017, both of which patents are incorporated herein by reference.

Note that the site controller 152 is shown in FIG. 1 as being located at and connected to a gateway 134. However, the site controller 152 may reside at other locations or be otherwise configured. As an example, it is possible for the site controller 152 to be implemented by the server 135. It is also possible for the site controller 152 to be integrated with and share resources with other components of the system 115. As an example, the site controller 152 may be located within a housing (not shown) of the gateway 134 and share processing resources or memory with other components of the gateway 134. It is also possible for portions of the site controller 152 to be at different locations. As an example, it is possible for some functions of the site controller 152 to be implemented at the gateway 134 and for some functions of the site controller 152 to be located elsewhere, such as at the server 135 or at a node 121-128. Locating the site controller 152 at the gateway 134 provides a convenient location for the site controller 152 to be able to reach the nodes 121-128 without disruptions that could be caused by communication problems through the network 136. However, as noted above, other locations of the site controller 152 are possible.

Figure 2:
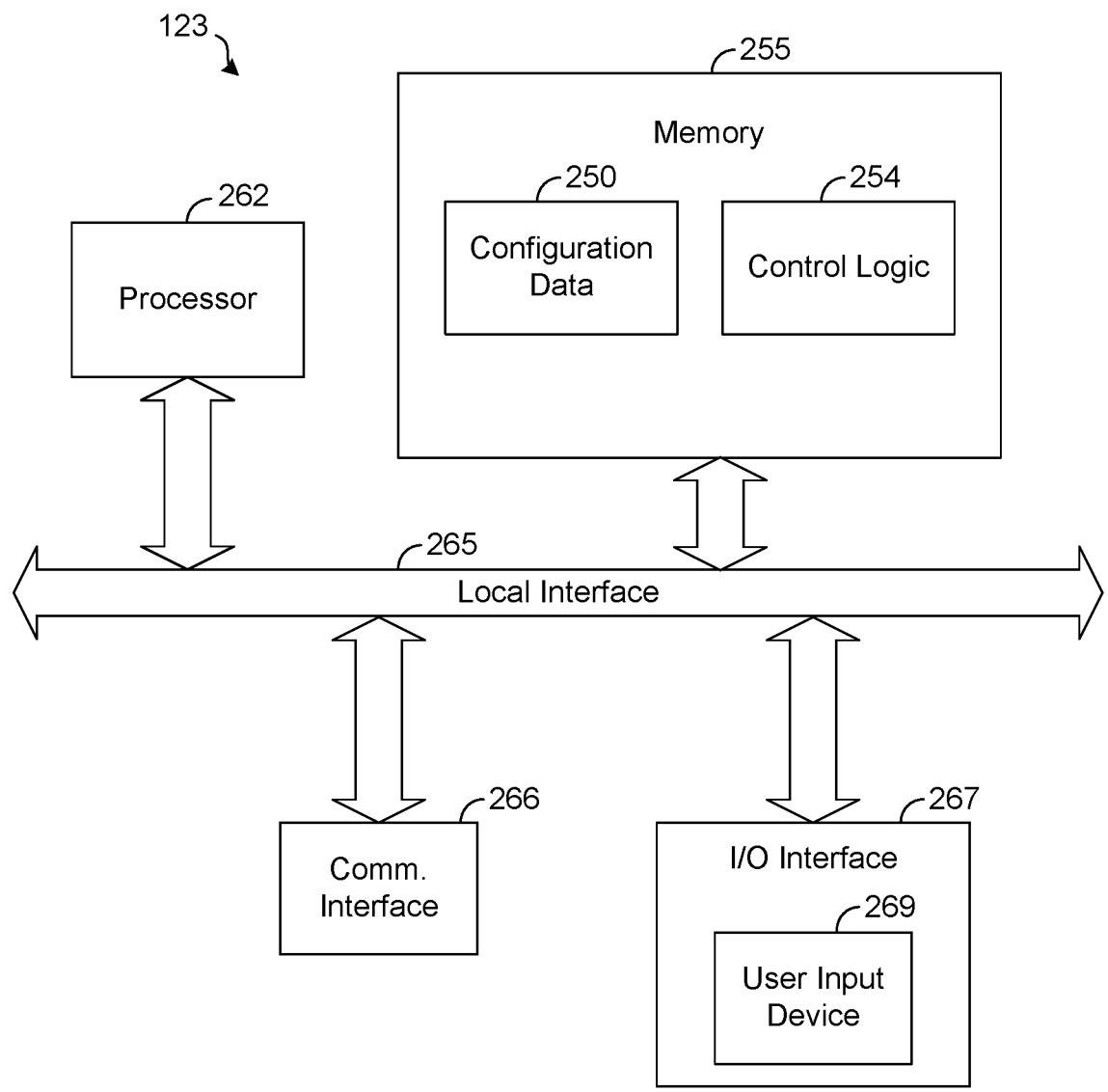
FIG. 2 is a block diagram illustrating an exemplary embodiment of a network node, such as depicted by FIG. 1.

FIG. 2 depicts an exemplary embodiment of a node 123 of the network 120. Note that any of the nodes 121-128 of the network 120 may be configured the same as or similar to the node 123 shown by FIG. 2. The node 123 may include control logic 254 that may be configured to control the operation of the node 123. In the embodiment shown by FIG. 2, the control logic 254 is implemented in software and stored in memory 255 of the node 123. In other embodiments, the control logic 254 may be implemented in hardware or a combination of hardware and software. The memory 255 may also store configuration data 250, such as network settings that are used to enable communication with other nodes. As an example, the network settings may include a network identifier that uniquely identifies the network on which the node 123 is communicating, a channel identifier identifying a channel or frequency range for communicating on the network, and other types of network settings typically used by nodes for communicating on wireless networks.

The node 123 may include at least one conventional processor 262, which includes processing hardware for executing instructions stored in memory 255. As an example, the processor 262 may include a central processing unit (CPU) or a digital signal processor (DSP). The processor 262 may communicate to and drive the other elements within the node 123 via a local interface 265, which may include at least one bus.

Note that control logic 254, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node 123 may also have a communication interface 266. The communication interface 266 may include a radio frequency (RF) radio or other device for wirelessly communicating with the components of the network 120. Using the communication interface 266, the node 123 may communicate with other nodes of the network 120 or other external devices.

The node 123 can have one or more input/output (I/O) interfaces 267 for communicating with devices, such as sensors or lighting controllers. The I/O interface 267 may include one or more user input devices 269, such as a button or switch, for receiving a user input.

Figure 3:
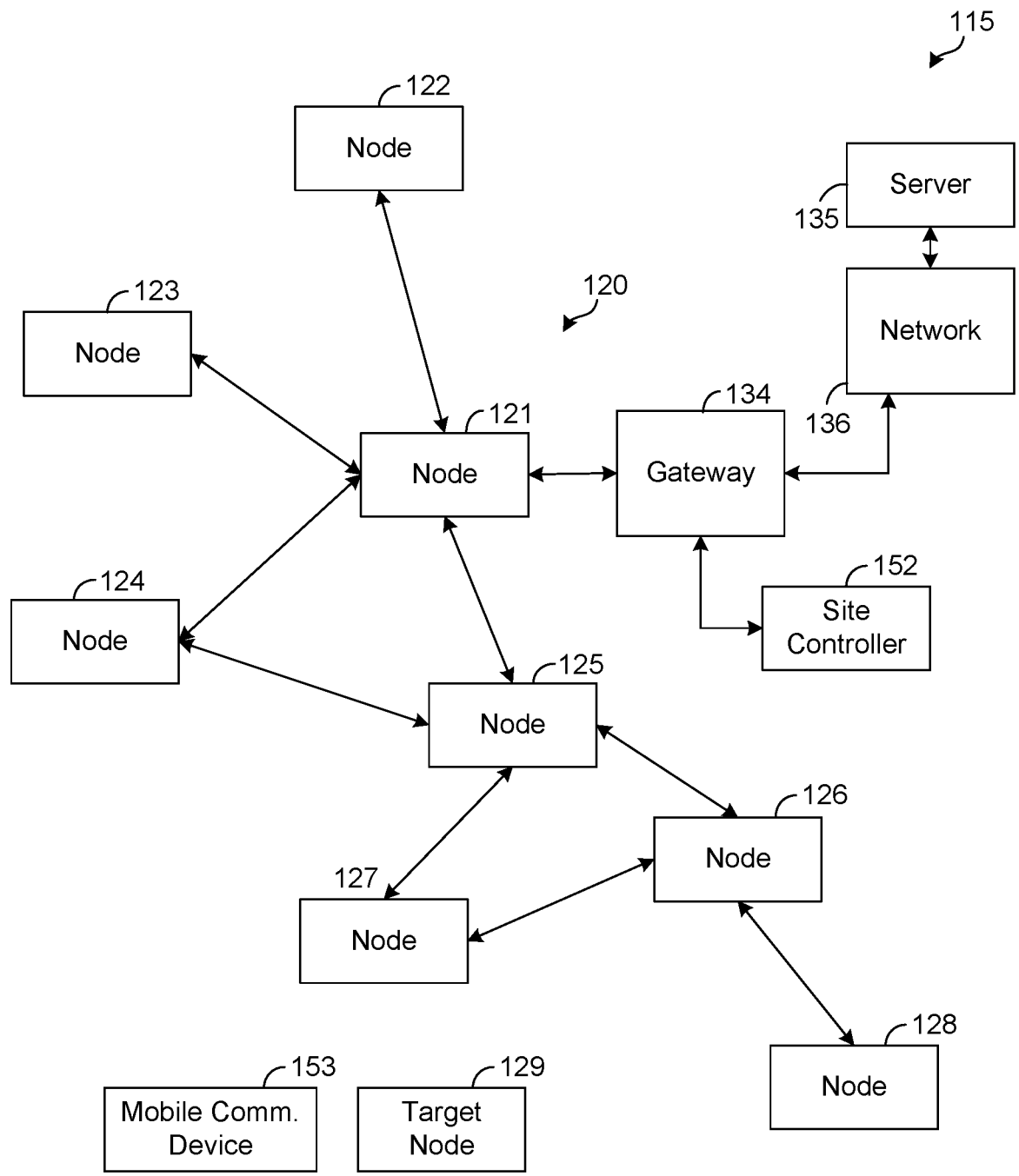
FIG. 3 is a block diagram illustrating select components of the communication system depicted by FIG. 1.

FIG. 3 is a simplified block diagram of the system 115 with some of the elements of FIG. 1 removed for simplicity of illustration. Referring to FIG. 3, each node 121-128 is able to communicate with any of the other nodes 121-128. In one embodiment, the nodes 121-128 can communicate among one another wirelessly, but it is possible for any of the nodes 121-128 to communicate over a conductive medium (e.g., a wire or fiber, or otherwise). In the embodiment shown in FIG. 3, the nodes 121-128 form a mesh network, and messages may hop from node-to-node in order to reach a destination. For example, node 125 is within direct communication range of nodes 121, 124, 126, and 127 and, thus, can communicate directly with any of these nodes 121, 124, 126, and 127, while node 128 is only within range of node 126 and can communicate directly with only node 126. If two nodes are unable to communicate directly (e.g., an obstruction blocks wireless communication between the two nodes or they are otherwise out of range of each other), the other nodes of the network 120 can be used to complete the communication path between the two nodes. As an example, if node 122 is attempting to communicate a message to node 127, the message could be forwarded through at least nodes 121, 125, and 126 in order to reach node 127 since there is no direct communication path between nodes 122 and 127.

In general, there are at least two types of messages that can be communicated to nodes across the network 120, unicast messages and multicast messages. A unicast message refers to a message that is destined for a specific node, and travels along a path defined by routing tables within the nodes in order to reach its destination. In general, each hop along the route will respond to a unicast message with an acknowledgement, to ensure that the message is successfully communicated to its destination. By this mechanism, data transmitted between nodes becomes more reliable. However, the exchange of acknowledgements and route discovery messages necessary to find routes through the network significantly increase network traffic and congestion.

A multicast message, unlike a unicast message, is a message that does not follow a single path defined by routing tables. The message is instead gradually retransmitted (also referred to as "broadcasting") by nodes that receive the message regardless of its destination or destinations. Since a multicast message is typically retransmitted by each node that receives it, a node that receives a multicast message usually does not return an acknowledgement to the sender.

A multicast message may include a header and a payload portion. Nodes 121-128 retransmit or broadcast the message through the network 120 based on the information in the message header. The header may include a time-to-live value, which is decremented every time the message is transmitted until it reaches zero or some set threshold, at which point the message is no longer retransmitted. Such practice eventually stops propagation of the multicast message so that it is not retransmitted in perpetuity. The header of the multicast message may include a group identifier for identifying nodes that are to process the message in addition to retransmitting it. Each node in a network may be provisioned so as to know groups of which it is a member.

Because multicast message do not follow a predefined route through the network but rather are retransmitted by each node that receives it, the transmission of a multicast messaging typically results in more traffic than the transmission of a unicast message. However, multicast messaging does not require route discovery, thereby eliminating the need of performing route discovery and the traffic associated with such discovery. In some embodiments, the nodes 121-128 are configured to communicate via multicast messaging so as to avoid the complications and traffic associated with route discovery, but unicast messaging may be used in other embodiments.

Generally, each message communicated within the network 120 has a network identifier (NetID) field that is used to prevent the nodes 121-128 from responding to messages from foreign networks. In this regard, as previously described above, the network 120 is associated with a network identifier, referred to hereafter as "primary network identifier" or "primary NetID," that uniquely identifies the network 120 from other foreign networks. Generally, by the time each node 121-128 has been added to the network 120, each node 121-128 has been assigned at least (1) a node address that uniquely identifies the node relative to the other nodes of the network 120 and (2) the primary NetID that uniquely identifies the network 120 from other networks. Such information may be stored in the node's memory as the configuration data 254 (FIG. 2).

Each node 121-128 of the network 120 is configured to recognize the primary NetID. In this regard, when a node 121-128 receives a message that includes the primary NetID in the message's NetID field, the node 121-128 does not drop the message but rather receives and further processes it. If, however, the node 121-128 does not recognize the information in the NetID field as a valid identifier for the network 121-128, then the node 121-128 immediately drops the message without further processing it. Thus, if a message does not include an identifier in the NetID field recognized by the receiving node as a valid network identifier, the receiving the node drops the message without further processing it so as to not waste processing resources on a message from a foreign network.

The topology of the network 120 may be known by the site controller 152. The topology of the network 120 may include information about the nodes 121-128 in the network, including which nodes 121-128 may communicate directly with each other. The topology of the network 120 may be determined using various techniques. For example, the site controller 152 may initiate a topology discovery process in which the site controller 152 communicates with the nodes 121-128 to learn the topology of a network. Commonly-assigned U.S. Pat. No. 9,226,220, entitled "Systems and Methods for Performing Topology Discovery in Wireless Networks" and granted on Dec. 29, 2015, which is incorporated herein by reference, describes exemplary methods of discovering the topology of a wireless network.

Figure 4:
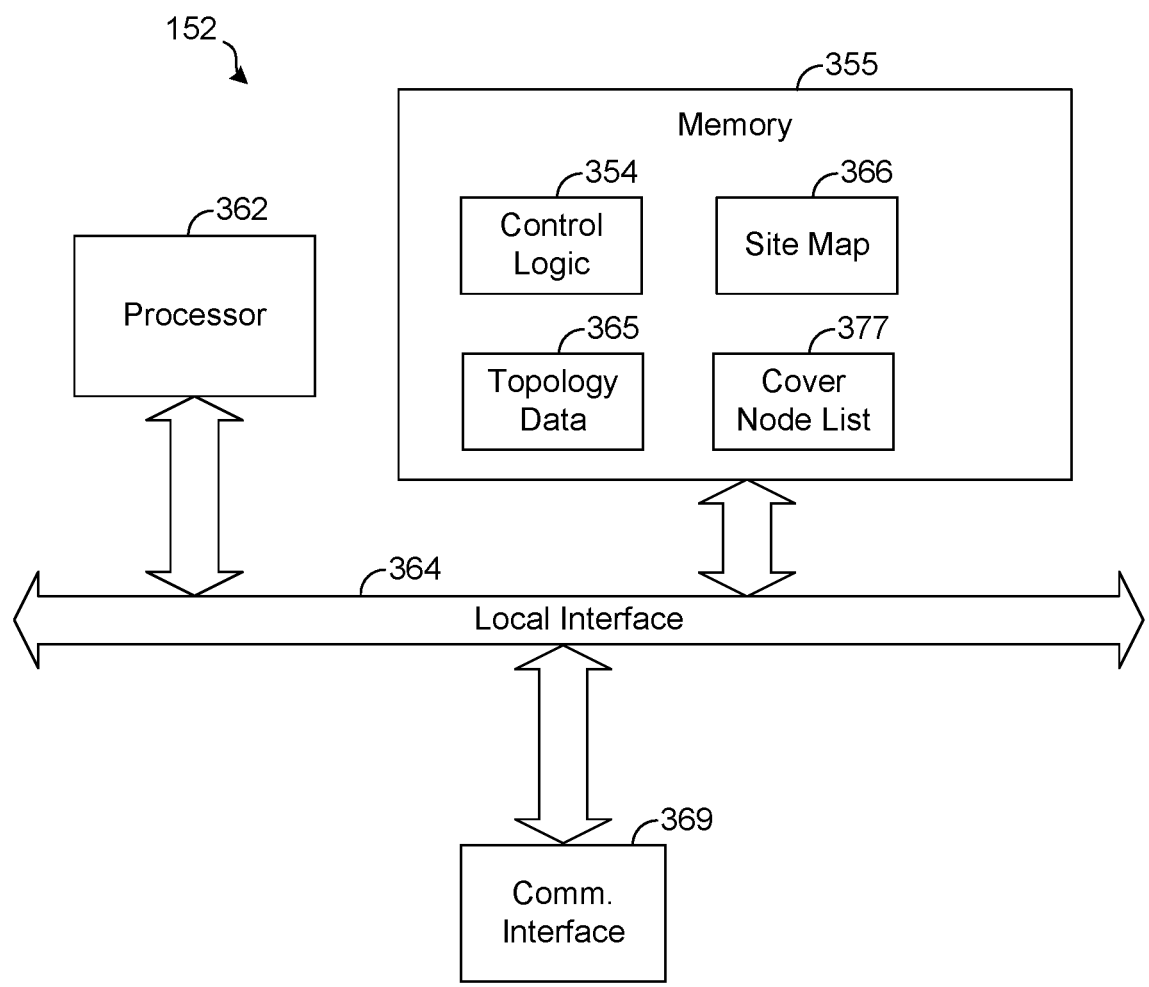
FIG. 4 is a block diagram illustrating an exemplary embodiment of a site controller, such as depicted by FIG. 3.

FIG. 4 depicts an exemplary embodiment of the site controller 152. The site controller 152 may include control logic 354 that may be configured to control the operation of the controller 152. In the embodiment shown by FIG. 4, the control logic 354 is implemented in software and stored in memory 355 of the site controller 152. In other embodiments, the control logic 354 may be implemented in hardware or a combination of hardware and software. The memory 355 may also store topology data 365 indicating the topology of the network 120, as determined via a topology discovery algorithm as described above, and the memory 355 may store a site map 366 indicating the geographic locations of the nodes 121-128. Such a site map 366 may be stored to the site controller 152 by a user before or after installation. Exemplary methods of defining a site map are described in commonly-assigned U.S. Pat. No. 9,374,874. When rendered, the site map 366 may display a map of the site at which the nodes 121-128 are located, and each node 121-128 or a component associated with the node, such as a light source controlled by the node, may be represented as a graphical icon on the map. Further, the placement of the icon for a given node 121-128 may correspond to the node's geographic location. Thus, by viewing the site map 121-128 the relative locations of the nodes 121-128 may be determined. Note that the site map 366 may defined to also indicate the topology of the network 120, including which nodes are in direct communication range of each other. In such embodiment, the topology data 365 is embodied by the site map 366 such that a separate set of topology data 365 is unnecessary.

As shown by FIG. 4, the site controller 152 may include at least one conventional processor 362, which includes processing hardware for executing instructions stored in memory 355. As an example, the processor 362 may include a central processing unit (CPU) or a digital signal processor (DSP). The processor 362 may communicate to and drive the other elements within the site controller 152 via a local interface 364, which may include at least one bus.

Note that control logic 354, when implemented in software, can be stored and transported on any computer-readable medium for use by or in connection with an instruction execution apparatus that can fetch and execute instructions. The site controller 152 may also have a communication interface 369. The communication interface 266 may include enable the site controller 152 to communicate with other components, such as the gateway 184 and/or nodes 121-128.

At various times, it may be desirable to add a node to the network 120. As an example, nodes may be added during installation of the network 120 or even after installation is complete. For example, a new node may be added to replace an existing node or to grow the network as demand increases or needs otherwise change. For illustrative purposes, referring to FIG. 3, assume that it is desirable to add the node 129 to the network 120. When a node 129 is added to the network 120, the node 129 is set up so that it is able to communicate with the other components, including nodes, of the network 120 using the specific network settings of network 120.

Before joining the network 120, the node 129 may be unaware of the primary NetID used by the nodes 121-128 of the network 120. In this regard, the new node 129 may be assigned a network identifier that is different than the primary NetID of the network 120. Thus, until its network settings are changed, the node 129 is generally not capable of communicating through the network 120.

Once the node 129 has been installed or otherwise positioned to be within range of at least one node 121-128 of the network, a user may notify the site controller 152 indicating that the node 129 should be added to the network 120. There are various techniques that may be used to provide such notification. As an example, the user may have a mobile communication device 153, such as a smartphone, tablet, or laptop computer, which can communicate with the site controller 152. As an example, the mobile communication device 153 may communicate with the site controller 152 through the network 136. In some embodiments, the mobile communication device 153 transmits the notification via cellular signals to reach the server 135 through the network 136, and the server 135 is configured to forward the notification through the network 136 and gateway 134 to the site controller 152. In other embodiments, the mobile communication device 153 may communicate with the site controller 152 through the wireless network 120. As an example, the mobile communication device 153 may form a node of the network 120 such that it is able to communicate with any of the nodes 121-128 within range of the device 153, and the nodes 121-128 in direct communication range of the device 153 may forward the notification to the site controller 152. In other embodiments, the device 153 may physically interface with one of the nodes 121-128 in order to access the network 120. Yet other techniques for enabling communication between the mobile communication device 153 and the site controller 152 are possible in other embodiments.

Once the notification from the mobile communication device 153 has been received by the site controller 152, the site controller 152 is configured to identify at least one node 121-128 to attempt communication with the new node 129, referred to hereafter as the "target" node, for configuring the target node for communication on the network 120. In this regard, if the identified node is able to successfully communicate with the target node 129, the identified node updates the network settings of the target node 129 so that the target node 129 can communicate over the network 120. As an example, the network identifiers used by the target node 129 may be updated with the primary NetID of the network 120. In addition, the target node 129 may be assigned a node address and also informed of a channel identifier identifying the channel used by the network 120. Thereafter, the target node 129 may use this information to communicate over the network 120.

In an effort to reduce disruption to the network 120, the site controller 152 may be configured to identify a subset of the nodes 121-128, referred to as "cover nodes" or a "set cover," to be used to attempt communication with the target node 129 for the purpose of configuring the target node 129. Ideally, the cover nodes are strategically selected such that the entire network 120 is "covered" with the fewest or at least a relatively small number of cover nodes. "Covered" generally refers to a state of the network 120 by which each network node is either a covered node or is one hop away from a covered node. That is, each node that is not one of the covered nodes is in direct communication with at least one of the covered nodes. Thus, if the network 120 is "covered" by the cover nodes, then any one-hop multicast message broadcast by all of the covered nodes should be received by every node of the network. Note that, as known in the art, a one-hop multicast message refers to a multicast message having a time-to-live value set such that the multicast message is not retransmitted. That is, a one-hop multicast message transmitted by a given node is received only by the other nodes that are within direct communication range of the transmitting node since these other nodes do not attempt to retransmit the message.

A node is considered "uncovered" if it is not one of the cover nodes and is not a neighbor of a covered node. Thus, an uncovered node will not receive a one-hop multicast message transmitted by all of the cover nodes.

The site controller 152 is configured to store identifiers (e.g., node addresses) of the cover nodes in a list 377 (FIG. 4), referred to hereafter as the "cover node list." In some embodiments, the site controller 152 is configured to select the cover nodes based on the number of neighbors associated with each respective node 121-128, as indicated by the topology data 365 or the site map 366. As used herein, one node is considered a "neighbor" of another node, when the nodes are in direct communication range or, in other words, within one hop of each other. As indicated above, based on the topology data 365 or the site map 366, the site controller 152 may be aware of the topology of the network 120 and thus be aware of which nodes are neighbors to each other, as well as how many neighbors each node has. In an effort to reduce the number of cover nodes, the site controller 152 may be configured to select the cover nodes to be the nodes of the network 120 with the most neighbors. In addition, the list 377 of cover nodes may be in some order, such as based on the number of neighbors associated with each cover node with the cover nodes having the greatest number of neighbors positioned higher in the list. For example, the cover nodes may be ordered such that the first node in the list 377 has the greatest number of neighbors, the second node in the list has the second-greatest number of neighbors, etc.

Figure 5:
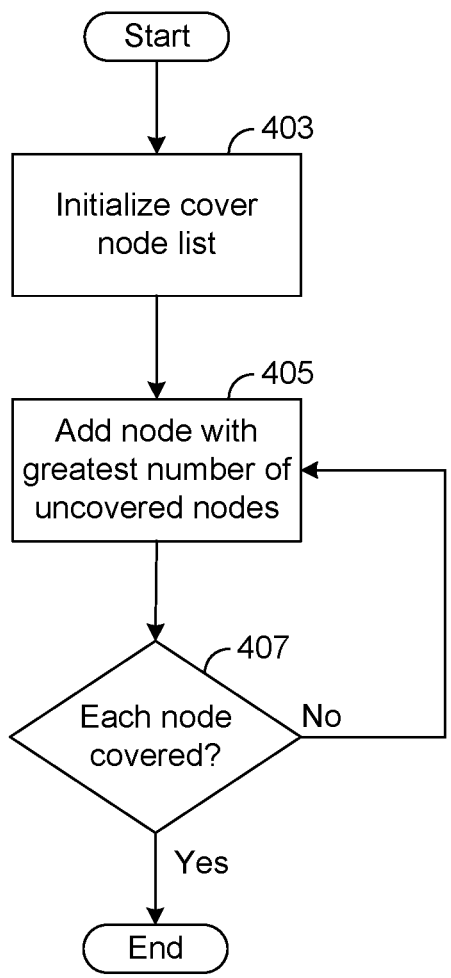
FIG. 5 is a flow chart illustrating an exemplary method for selecting cover nodes to be used for attempting communication with a target node that is using different network settings.

The cover nodes may be identified using various techniques. Exemplary techniques for selecting the cover nodes and defining the cover node list 377 are show by FIG. 5. In this regard, an empty list may be initialized in step 403. Then, the node 121-128 with the greatest number of uncovered neighbors may be added to the list 377 in step 405. Because the list 377 is initially empty, the first node added to the list 377 may be the node with the greatest number of neighbors of all nodes in the network 120. In step 407, it may be determined whether each node in the network 120 is covered. In this regard, a node is considered to be "covered" when it is either on the list 377 or is a neighbor of a node on the list 377. If any node 121-128 is uncovered, the node 121-128 with the most uncovered neighbors out of the nodes not yet added to the list 377 may be added. Steps 405 and 407 may be repeated until each network node 121-128 is covered (i.e., either in the list 377 or a neighbor of one of the nodes in the list 377, at which point the process may end.

As an example, referring to FIG. 3, the node 121 may be added to the list 377 first because it has the most neighbors of nodes 121-128. In such example, nodes 121-125 are then covered because the node 121 is on the list 377 and the nodes 122-125 are neighbors of the node 121. However, the nodes 126-128 are uncovered. After adding the node 121 to the list 377, the node with the greatest number of uncovered neighbors is selected out of the remaining nodes 122-128 not yet on the list, and this selected node is added to the list 377. In this example, each of the nodes 125-128 has two uncovered neighbors, and any of the nodes 125-128 may be selected for addition to the list 377. For illustrative purposes, assume that the node 125 is selected and added to the list 377. Now, the list 377 contains node 121 and node 125, and each node 121-127 is covered (i.e., either on the list 377 or a direct neighbor of a node on the list 377). In the next iteration of step 405 of FIG. 5, either the node 126 or the node 128 may be added to the list 377, thereby completing the set cover list 377 for the network 120. That is, all of the nodes 121-128 are either on the list 377 or a neighbor of a node on the list. The algorithm described above for defining the list 377 implements a greedy approximate set cover algorithm. In other embodiments, other types of algorithms for defining the list 377 are possible.

Once the cover node list 377 is defined, the site controller 152 may use the cover nodes identified by the list 377 as proxies in order to attempt communication with a target node 129 currently using different network settings. It is possible for all of the cover nodes in the list 377 to attempt communication with the target node 129 at about the same time. However, this would result in all of the cover nodes temporarily leaving the network 120 at the same time to attempt communication with the target node 129, thereby significantly disrupting the network 120. To avoid such disruption, the site controller 152 may go through the list 377 and instruct the cover nodes one at a time to attempt communication with the target node 129. Thus, at any given time, only one of the cover nodes has left the network 120 (i.e., changed its network settings) to attempt communication with the target node 129. Such an approach helps to reduce disruption to the network 120 but can require a significant amount of messaging with the site controller 152, thereby increasing network congestion.

In some embodiments, the site controller 152 reduces such congestion by using a multicast command, referred to hereafter as "proxy command," that can be broadcast through the network 120 and to which the cover nodes respond by sequentially attempting communication with the target node 129. As an example, in some embodiments, the site controller 152 may be configured to transmit a proxy command that identifies each cover node that is to attempt communication with the target node 129. In addition to identifying each such cover node, the proxy command may also indicate the order that the cover nodes are to attempt communication. As an example, each cover node identifier in the proxy command may be associated with a value indicating the order that the identified cover node is to attempt communication. Alternatively, the order of the cover node identifiers in the proxy command may indicate the order that the cover nodes are to attempt communication. For example, the cover nodes may be configured to attempt communication in the same order as the cover node identifiers in the proxy command. Yet other techniques for specifying the order of attempting communication are possible.

In addition to identifying the cover nodes that are to attempt communication with the target node 129, the proxy command may include information for enabling such communication, such as (1) the node address and network identifier being used by the target node 129, (2) the encryption scheme and keys for the encryption, if any, being used by the target node 129, and (3) the channel identifier of the channel being used by the target node 129, if different than the channel of the network 120. Note that the information about the target node 129 included in the proxy command may be obtained in any of several ways. As an example, when the target node 129 is installed, a user may use the mobile communication device 153 to transmit a notification to the site controller 152, as described above. Such notification may include the network settings being used by the target node 152. In other examples, other techniques for informing the site controller 152 about the network settings of the target node 129 are possible.

Upon receiving the proxy command, each cover node identified by the proxy command begins to track time from reception of the proxy command (or some other reference event) using an internal clock in order to divide the time period following the proxy command (or other reference event) into a plurality of windows, referred to herein as "proxy windows." The duration of each proxy window is preferably sufficient to allow a cover node to switch to the network settings of the target node 129 and attempt communication with the target node 129. In addition, the cover nodes are configured such that only one cover node attempts communication with the target node 129 during a given proxy window, though it is possible for more than one cover node to attempt communication with the target node 129 at the same time, if desired. However, increasing the number of cover nodes attempting communication with the target node 129 as the same time generally increases the disruption to the network 120 for the reasons described above.

As an example, during the first proxy window following the proxy command, the first cover node that is to attempt communication with the target node 129 according to the order indicated by the proxy command is configured to function as a proxy by changing its network settings for communication with the target node. Notably, during this time, this first cover node will be unable to communicate with the other nodes of the network 120 that are using the network settings of the network 120. If this first cover node is unable to communicate with the target node 129 by the end of the first proxy window, the first cover node stops attempting communication with the target node 129 and changes its network settings back for communication on the network 120. In addition, after the end of the first proxy window, the next proxy window begins, and the next cover node attempts communication with the target node 129 in the same way. This process continues such that the cover nodes one-by-one automatically attempt communication with the target node 129 until either communication with the target node 129 is successful with one of the cover nodes or all of the cover nodes have unsuccessfully attempted communication with the target node 129. If none of the cover nodes is able to communicate with the target node 129 after expiration of each proxy window for the cover set, the site controller 152 may be configured to select a new cover set and use the new cover set in the same way in order to attempt communication with the target node 129.

At some point, a cover node will likely be able to communicate successfully with the target node 129 assuming that the target node 129 is in direction communication range of at least one cover node. When the target node 129 receives a message from a cover node attempting to communicate with it, the target node 129 may respond with a reply that is received by such cover node, referred to hereafter as the "proxy." Upon receiving such reply, the proxy is aware that the target node 129 has been successfully reached. In response, the proxy may transmit another message to the target node 129 informing it of the network settings of the network 129, if such information is not included in the message already received by the target node 129 from the proxy. At this point, the target node 129 can switch to the network settings of the network 120 and begin communicating on the network 120.

In addition to informing the target node 129 of the network settings of the network 120, the proxy may be configured to communicate with other cover nodes to inform them that the target node 129 has been reached so that the other cover nodes will no longer attempt communication with the target node 129. This helps to reduce network congestion by preventing the cover nodes from needlessly sending messages using the target node's network settings. It also helps to prevent disruption of the network 120 by preventing the cover nodes from needlessly leaving the network 120 (i.e., changing their network settings to a different network) to attempt communication with the target node 129 in response to the proxy command after the target node 129 has already been found.

In some embodiments, the proxy informs the other cover nodes of successful communication with the target node 129 by transmitting a multicast message through the network 120. As the message propagates through the network, the other cover nodes should hear the message and interpret the message as notice that the target node 129 has been successfully reached. Such message may include information unique to the target node 129 (e.g., a node address of the target node 129) so that the cover nodes may correlate the message with the target node 129 being searched.

By using the messaging scheme described above, it is possible trigger a process to have the cover nodes one-by-one search for the target node 129 and then stop the process once the target node 129 is found with a relatively small amount of messaging on the network 120. Indeed, the process can be started and stopped by the transmission of only two multicast messages: the proxy command that triggered the process and the message transmitted by the proxy to the other cover nodes informing them that the target node 129 has been found. In other embodiments, other techniques for controlling the cover nodes in attempting communication with the target node 129 are possible.

As an example, rather than attempting communication with the target node 129 in a predefined order indicated by proxy command or otherwise, it is possible for the cover nodes to attempt communication with the target node 129 randomly in response to the proxy command such that it is not likely that each cover node attempts communication with the target node 129 at the same time. In such embodiments, the cover nodes may attempt communication with the target node 129 at random times within a certain range after receiving the proxy command, and each cover node may stop such an attempt after a predefined time period from commencing the attempt. Once the target node 129 is found by one of the cover nodes, such cover node may then broadcast a message that the target node 129 has been found, as described above, so that other cover nodes will no longer attempt communication with the target node 129.

In some embodiments, a target node 129 can be added to an existing network using the site map 366 (FIG. 4). In this regard, when the target node 129 is installed, a user of the mobile communication device 153 may notify the site controller 152 of installation of the target node 129, as described above. The user may also provide an input indicating the location of the target node 129. As an example, the site controller 152 may send the site map 366 to the mobile communication device 153, which displays the map 366 to the user, and the user may provide an input indicating the location of the target node on the map 366. The mobile communication device 153 may then transmit information indicative of this location to the site controller 152. In other embodiments, other techniques for informing the site controller 152 of the location of the target node 129 are possible.

As an example, if the location of the mobile communication device 153 is known, the location of the mobile communication device 153 may be used as the approximate location of the target node 129, assuming that the user of the mobile communication device 153 has positioned it in close proximity to the target node 129, such as when the user is installing the target node 129. For example, the mobile communication device 153 may have a location sensor, e.g., a global positioning system (GPS) sensor or a radio frequency (RF) device that uses triangulation or trilateration with local signals, that is configured to determine the location of the mobile communication device 153. In other examples, the user of the mobile communication device 153 may input or otherwise indicate the location of the device 153. The mobile communication device 153 may be configured to transmit the location of the device 153 to the site controller 152, which then uses such location as the location of the target node 129 for identifying one or more cover nodes to communicate with the target node 129. In other embodiments, yet other techniques for informing the site controller 152 of the location of the target node 129 are possible.

Using the location of the target node 129 and the site map 366, the site controller 152 is configured to select one or more nodes 121-128 of the network 120 for attempting communication with the target node 129. In some embodiments, the selection is based on the location of the target node 129 relative to the locations of the nodes 121-128 indicated by the site map 337. As an example, the site controller 152 may be configured to determine a distance between the location of the target node 129 and the location of each node 121-128 of the network 120 and to compare the determined distances for use in selecting the cover nodes. For example, the site controller 152 may be configured to select the node 121-128 closest to the location of the target node 129 as the first cover node to attempt communication with the target node 129. If this closest node 121-128 is unable to communicate with the target node 129, the site controller 152 may select the next closest node 121-128 to the location of the target node 129 as the next cover node to attempt communication with the target node 129. Such a selection process may continue until a certain number of cover nodes has been selected or until communication with the target node 129 is successfully achieved.

After selecting a cover set in this manner, the site controller 152 may sequentially control the cover set one-by-one to attempt communication with the target node 129, as described above for the embodiment that uses a greedy approximation to select the cover set. This may be achieved by communicating with the cover nodes one-by-one until the target node is found. Alternatively, the site controller 152 may be configured to define a cover set based on the relative locations of the nodes 121-128 and the target node 129 and then transmit a multicast proxy command that is received by all of the cover nodes, as described above. As an example, the site controller 152 may select the three (or some other number) nodes 121-128 that are the closest to the location of the target node 129 and transmit a multicast proxy command that identifies all three of the selected cover nodes, which then attempt to communicate with the target node 129 one-by-one in separate proxy windows, as described above. In such example, the multicast proxy command may indicate the order that the cover nodes are to attempt communication, such as based on the cover node's distance (e.g., from closest to farthest).

In some embodiments, the site controller 152 may be configured to use a combination of the approaches described above. As an example, the site controller 152 may be configured to select a first cover set based on the site map 366 and the location of the target node 129 (e.g., select the x number of nodes 121-128 closest to the location of the target node 129, where x is any positive integer) and then have the first cover set attempt communication with the target node 129 using the techniques described above. If communication with the target node 129 is unsuccessful with the first cover set, the site controller 152 may select a new cover set using a different approach, such as using the greedy approximation approach described above for considering the number of uncovered neighbors. The site controller 152 may then have this new cover set attempt communication with the target node 129 using the techniques described above.

In yet other embodiments, a cover set may be selected using different approaches. As an example, the first few nodes of a cover set may be selected based on respective distances to the target node and the next few nodes of a cover set may be selected based on the greedy approximation algorithm approach described above. In some embodiments, the site controller 152 may be configured to select a cover set based on respective distances to the target node provided that the target node's location is known. However, if the location of the target node is unknown, the site controller 152 may be configured to use a different technique to select the cover set, such as use of the greedy approximation algorithm approach described above. Yet other techniques for selecting a cover set are possible in other embodiments.

Figure 6:
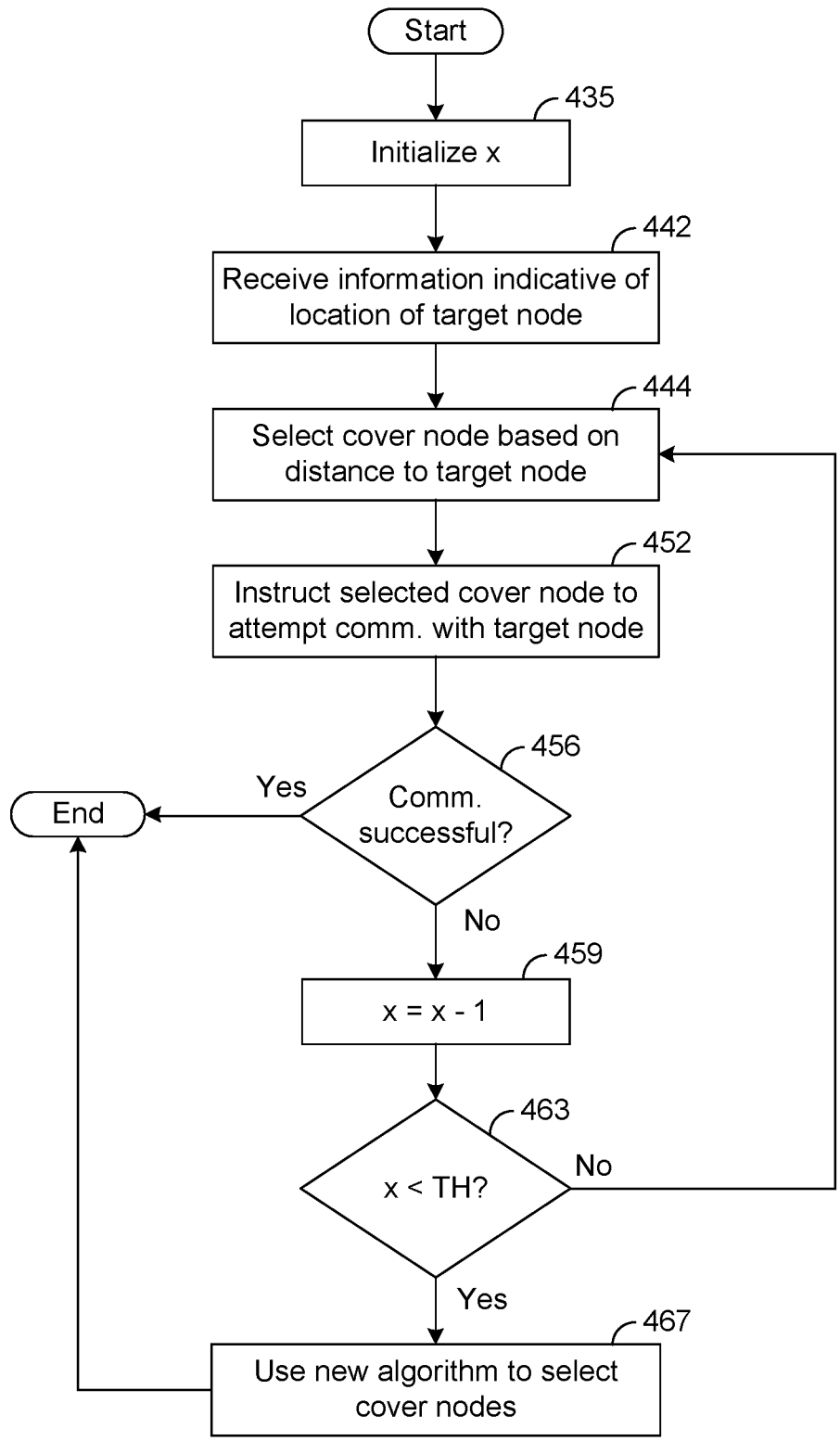
FIG. 6 is a flow chart illustrating an exemplary method for selecting cover nodes to be used for attempting communication with a target node that is using different network settings.

FIG. 6 depicts an exemplary method that may be used to select cover nodes for attempting communication with the target node 129.

Initially, as shown by block 435 of FIG. 6, the site controller 152 may initialize a variable, x, to a desired value corresponding to the number of cover nodes to be selected based on distance, as will be described in more detail below. For illustrative purposes, assume that a user of the mobile communication device 153 installs the target node 129, which is not yet configured for communication on the network 120. The user may control the mobile communication device 153 to transmit to the site controller 152 information indicative of the location of the target node 129, and the site controller 152 may receive such information, as shown by block 442 of FIG. 6. As an example, the mobile communication device 153 may communicate with the site controller 152 to receive and then display the site map 366. While viewing the site map the user may provide an input indicating the approximate location of the target node 129 on the site map 366. For example, if the mobile communication device 153 has a touchscreen displaying the site map 366, the user may touch the approximate location of the target node 129 on the displayed site map 366. In other embodiments, other types of inputs (e.g., moving a cursor over the displayed site map 366) may be provided to indicate the location of the target node 129.

Based on the location of the target node 129, the site controller 152 selects a cover node to be used to attempt communication with the target node 129, as shown by block 444 of FIG. 6. As an example, the site controller 152 may determine the distance between the target node 129 and each node 121-128 based on the locations indicated by the site map 366. For example, to determine the distance between the target node 129 and the node 128, the site controller 152 may subtract the location of the node 128 indicated by the map 336 from the location of the target node 129 indicated by the map 366. After determining the respective distances, the site controller 152 may select in block 444 the cover node determined to be the node with the shortest distance to the target node 129.

As shown by block 452, the site controller 152 instructs the selected cover node to attempt communication with the target node 129 by changing its network settings to be compatible with the target node 129 (changing is network settings so that they correspond to the network settings used by the target node 129 for communication). If communication with the target node is successful, the selected cover node may communicate with the target node 129 to change network settings of the target node 129 to be compatible with the network 120, thereby enabling the target node 129 to communicate with the nodes 120-128 of the network 120. The selected cover node may also change its network settings back to those of the network 120 and then communicate with the site controller 152 to inform it of the successful re-configuration of the target node 129. In such case, the site controller 152 makes a "yes" determination in block 456 and the process ends.

If communication with the target node 129 is unsuccessful, the selected cover node may change its network settings back to those of the network 120 and then communicate with the site controller 152 to inform it of the unsuccessful communication attempt. In such case, site controller 152 makes a "no" determination in block 456 and decrements x, as shown by block 459. In block 463, the site controller 152 determines whether x has fallen below a predefined threshold. If not, the site controller 152 selects a new cover node, such as the next closest node 120-128 relative the location of the target node 129 indicated by the site map 366, and the aforementioned process is repeated for this newly selected node. This process continues until successful communication with the target node 129 occurs such that the network settings of the target node 129 are changed to those of the network 120, thereby enabling the target node 129 to communicate through the network 120 or until x falls below the threshold indicating that a predefined number of unsuccessful attempts have occurred.

If x does fall below the threshold, then the site controller 152 may attempt to use a different algorithm to select cover nodes for attempting communication with the target node 129, as shown by block 467 of FIG. 6. As an example, the site controller 152 may select cover nodes using an approach described above with reference to FIG. 5.

Note that it is unnecessary for the site controller 152 to sequentially instruct the cover nodes selected in block 444 to attempt communication with the target node 129. For example, rather than instructing each selected cover node in block 452 for each iteration of block 444, it is possible for the site controller 152 to select cover nodes until a predefined number of cover nodes have been selected based on distance. As an example, some predefined number of the nodes 121-128 closest to the target node 129 may be selected and then such nodes may be instructed to communicate with the target node 129 in a predefined order or otherwise using a multicast proxy command, as described above. Such selected cover nodes may then attempt communication with the target node 129 sequentially or otherwise until at least one of the selected cover nodes has successfully communicated with and re-configured the target node 129.

Various other changes and configurations would be apparent to person of ordinary skill upon reading this disclosure.

What is claimed is:

1. A wireless network, comprising:
a plurality of nodes; and
at least one controller having memory configured to store a site map indicating a location for each of the plurality of nodes, the at least one controller configured to receive information indicating a location of a target node that is using network settings of a different network for communication and is unaware of network settings of the wireless network, the at least one controller configured to compare the location of the target nodes to locations of the plurality of nodes indicated by the site map and to select automatically, based on comparisons of the location of the target node to the locations of the plurality of nodes indicated by the site map, a first subset of the plurality of nodes for attempting communication with the target node using the network settings of the different network, the at least one controller further configured to instruct each node of the first subset to attempt communication with the target node using the network settings of the different network for changing the network settings used by the target node such that the target node communicates through the wireless network.

2. The wireless network of claim 1, wherein for each of the plurality nodes, the at least one controller is configured to determine a distance of the respective node of the plurality of nodes from the target node.

3. The wireless network of claim 2, wherein the at least one controller is configured to determine which of the plurality of nodes has a shortest distance to the target node, and wherein the first subset includes at least one of the plurality of nodes determined to have the shortest distance to the target node.

4. The wireless network of claim 1, the at least one controller is further configured to transmit a multicast proxy command for identifying each node of the first subset and indicating an order that the nodes of the first subset are to attempt communication with the target node using the network settings of the different network, and wherein a first node of the first subset that successfully communicates with the target node using the network settings of the different network is configured to communicate the network settings of the wireless network to the target node thereby enabling the target node to communicate through the wireless network.

5. The wireless network of claim 4, wherein the first node is configured to transmit a multicast message for notifying other nodes of the first subset of successful communication with the target node.

6. The wireless network of claim 5, wherein a second node of the subset is configured to refrain from attempting communication with the target node using the network settings of the different network in response to the multicast message transmitted by the first node.

7. The wireless network of claim 1, wherein the at least one controller is configured to select automatically a second subset of the plurality of nodes for attempting communication with the target node if each node of the first subset is unable to communicate with the target node using the network settings of the different network, the at least one controller further configured to transmit a multicast proxy command for identifying each node of the second subset and indicating an order that the nodes of the second subset are to attempt communication with the target node using the network settings of the different network.

8. A method, comprising:
storing in memory a site map indicating a location for each of a plurality of nodes of a wireless network;

receiving, with at least one controller, information indicating a location of a target node that is using network settings of a different network for communication and is unaware of network settings of the wireless network;

comparing, with the at least one controller, the location of the target node to locations of the plurality of nodes indicated by the site map;

automatically selecting, with the at least one controller based on the comparing, a first subset of the plurality of nodes for attempting communication with the target node using the network settings of the different network; and instructing, with the at least one controller, each node of the first subset to attempt communication with the target node using the network settings of the different network for changing the network settings used by the target node such that the target node communicates through the wireless network.

9. The method of claim 8, further comprising determining, with the at least one controller for each of the plurality of nodes based on the comparing, a distance of the respective node of the plurality of nodes from the target node.

10. The method of claim 9, further comprising determining, with the at least one controller based on the comparing, which of the plurality of nodes has a shortest distance to the target node.

11. The method of claim 8, further comprising transmitting, with the at least one controller through the wireless network, a multicast proxy command for identifying each node of the first subset and indicating an order that the nodes of the first subset are to attempt communication with the target node using the network settings of the different network.

12. The method of claim 11, further comprising transmitting, by a first node of the first subset that successfully communicates with the target node using the network settings of the different network, the network settings of the wireless network to the target node thereby enabling the target node to communicate through the wireless network.

13. The method of claim 12, further comprising transmitting, by the first node, a multicast message for notifying other nodes of the first subset of successful communication with the target node.

14. The method of claim 13, further comprising refraining, by a second node of the first subset, from attempting communication with the target node using the network settings of the different network in response to the multicast message transmitted by the first node.

15. The method of claim 8, further comprising:

automatically selecting, with the at least one controller, a second subset of the plurality of nodes for attempting communication with the target node if each node of the first subset is unable to communicate with the target node using the network settings of the different network; and transmitting through the wireless network a multicast proxy command for identifying each node of the second subset and indicating an order that the nodes of the second subset are to attempt communication with the target node using the network settings of the different network.

* * * * *